US010273821B2

(12) United States Patent
Fitzpatrick

(10) Patent No.: US 10,273,821 B2
(45) Date of Patent: Apr. 30, 2019

(54) ADVANCED STATIONARY SEALING COOLED CROSS-SECTION FOR AXIAL RETENTION OF CERAMIC MATRIX COMPOSITE SHROUDS

(71) Applicant: General Electric Company, Schenectady, NY (US)

(72) Inventor: Dylan James Fitzpatrick, Peabody, MA (US)

(73) Assignee: General Electric Company, Schenectady, NY (US)

( * ) Notice: Subject to any disclaimer, the term of this patent is extended or adjusted under 35 U.S.C. 154(b) by 480 days.

(21) Appl. No.: 14/850,383

(22) Filed: Sep. 10, 2015

(65) Prior Publication Data

US 2017/0074111 A1 Mar. 16, 2017

(51) Int. Cl.
*F01D 11/00* (2006.01)
*F01D 11/08* (2006.01)
(Continued)

(52) U.S. Cl.
CPC ............ *F01D 11/08* (2013.01); *F01D 11/003* (2013.01); *F01D 11/005* (2013.01); *F02C 3/04* (2013.01);
(Continued)

(58) Field of Classification Search
CPC ............ F05D 2240/11; F05D 2240/55; F05D 2240/57; F05D 2260/204; F05D 2260/203;
(Continued)

(56) References Cited

U.S. PATENT DOCUMENTS 4,300,273 A 11/1981 Lockhart
5,249,814 A * 10/1993 Halling ............... F16J 15/0887
228/214
(Continued)

FOREIGN PATENT DOCUMENTS

CN 1616806 A 5/2005
EP 2381070 A2 10/2011
(Continued)

OTHER PUBLICATIONS

Machine Translation and a Notification of Reasons for Refusal issued in connection with corresponding JP Application No. 2016-163189 dated Aug. 15, 2017.
(Continued)

*Primary Examiner* — William H Rodriguez
*Assistant Examiner* — Kyle Thomas
(74) *Attorney, Agent, or Firm* — General Electric Company; Kristi L. Davidson

(57) ABSTRACT

In one aspect, the present subject matter is directed to a gas turbine sealing assembly that includes a first static gas turbine wall and a second static gas turbine wall. A seal is disposed between the first static gas turbine wall and the second static gas turbine wall. The seal includes a first seal layer defining a first seal layer aperture extending therethrough. A second seal layer defines an elongated slot extending therethrough. The elongated slot includes a first end and a second end. A third seal layer defines a third seal layer aperture extending therethrough. The second seal layer is positioned between the first seal layer and the third seal layer such that the first seal layer aperture is in fluid communication with the first end and the third seal layer aperture is in fluid communication with the second end.

15 Claims, 4 Drawing Sheets

(51) Int. Cl.
*F16J 15/02* (2006.01)
*F02C 3/04* (2006.01)
*F02C 7/28* (2006.01)

(52) U.S. Cl.
CPC ............ *F16J 15/02* (2013.01); *F16J 15/022* (2013.01); *F02C 7/28* (2013.01); *F05D 2240/55* (2013.01); *Y02T 50/672* (2013.01)

(58) Field of Classification Search
CPC .. F05D 2250/75; F05D 2260/201; F02C 7/28; F01D 11/003; F01D 11/005; F16J 15/02; F16J 15/022; F16J 15/104
See application file for complete search history.

(56) References Cited

U.S. PATENT DOCUMENTS

| | | | | |
|---|---|---|---|---|
| 5,560,198 A | * | 10/1996 | Brewer | F02K 1/80 277/628 |
| 5,649,806 A | * | 7/1997 | Scricca | F01D 11/08 415/115 |
| 5,716,052 A | | 2/1998 | Swensen et al. | |
| 2005/0073114 A1 | | 4/2005 | Amos et al. | |
| 2005/0123389 A1 | * | 6/2005 | Morris | F01D 9/04 415/1 |
| 2008/0050236 A1 | * | 2/2008 | Allen | F01D 11/008 416/190 |
| 2008/0213096 A1 | | 9/2008 | Johnson Campino et al. | |
| 2010/0326380 A1 | | 12/2010 | Fedeson et al. | |
| 2012/0148769 A1 | * | 6/2012 | Bunker | B23P 15/04 428/34.1 |
| 2015/0300192 A1 | * | 10/2015 | Smoke | F01D 11/005 415/116 |

FOREIGN PATENT DOCUMENTS

| | | |
|---|---|---|
| JP | S55-500834 A | 10/1980 |
| WO | 0012920 A1 | 3/2000 |

OTHER PUBLICATIONS

Machine Translation and a First Office Action and Search issued in connection with corresponding CN Application No. 201610812416.2 dated Sep. 21, 2017.

European Search Report & Opinion issued in connection with corresponding EP Application No. 16187198.3 dated Jan. 26, 2017.

* cited by examiner

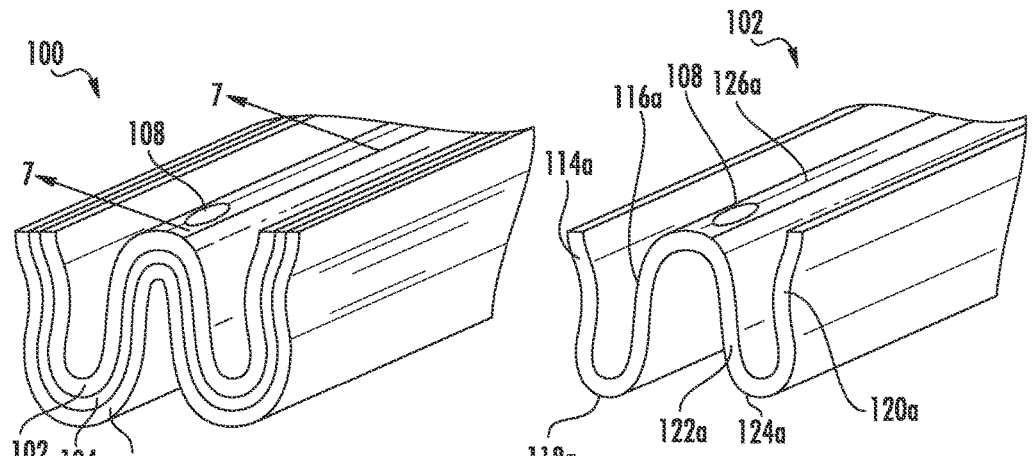
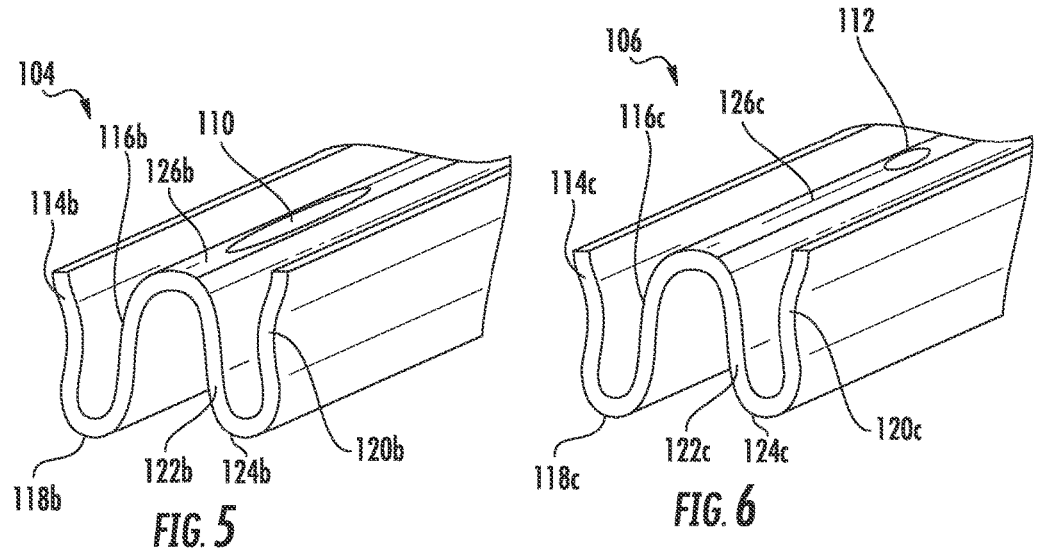
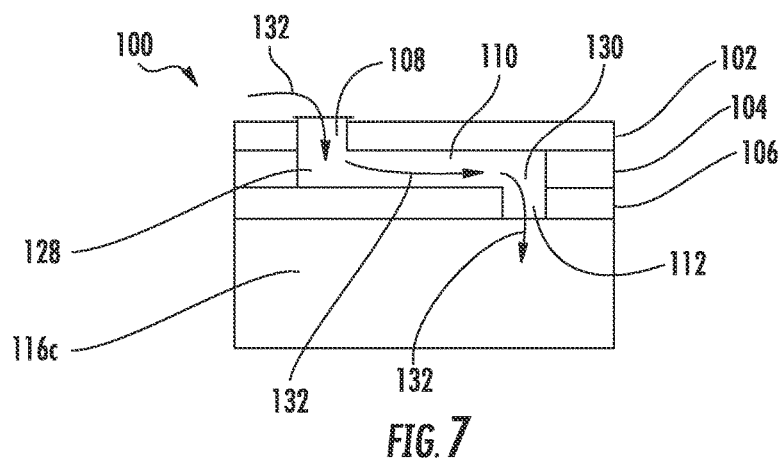

ADVANCED STATIONARY SEALING COOLED CROSS-SECTION FOR AXIAL RETENTION OF CERAMIC MATRIX COMPOSITE SHROUDS

FIELD OF THE INVENTION

The present subject matter relates generally to a sealing assembly for a gas turbine engine. More particularly, the present subject matter relates to a sealing assembly for adjacent stationary components of a gas turbine engine having at least one cooling passage therein.

BACKGROUND OF THE INVENTION

A gas turbine engine generally includes, in serial flow order, a compressor section, a combustion section, a turbine section, and an exhaust section. In operation, air enters an inlet of the compressor section where one or more axial compressors progressively compress the air until it reaches the combustion section. Fuel mixes with the compressed air and burns within the combustion section, thereby creating combustion gases. The combustion gases flow from the combustion section through a hot gas path defined within the turbine section and then exit the turbine section via the exhaust section.

In particular configurations, the turbine section includes, in serial flow order, a high pressure (HP) turbine and a low pressure (LP) turbine. The HP turbine and the LP turbine each include various stationary turbine components (e.g., stator vanes or nozzles, turbine shrouds, shroud supports, etc.) that at least partially define the hot gas path through the turbine section. These stationary components are typically constructed from materials capable of withstanding prolonged exposure to the hot gasses (e.g., ceramic matrix composite). Nevertheless, the stationary components positioned radially outward from the hot gas path (e.g., casing) may have less favorable thermal properties. In this respect, seals may be disposed between adjacent stationary components along the hot gas path to prevent hot exhaust gases from flowing therebetween.

Conventional sealing arrangements may limit the temperatures of the hot gasses flowing through the turbine section, thereby hindering the efficiency of the gas turbine engine. Accordingly, a sealing assembly for adjacent stationary components of a gas turbine engine having at least one cooling passage therein would be welcomed in the technology. Such a sealing assembly would permit the gas turbine engine to burn hotter, thereby improving specific fuel consumption.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a gas turbine sealing assembly that includes a first static gas turbine wall and a second static gas turbine wall. A seal is disposed between the first static gas turbine wall and the second static gas turbine wall. The seal includes a first seal layer defining a first seal layer aperture extending through the first seal layer. A second seal layer defines an elongated slot extending through the second seal layer. The elongated slot includes a first end and a second end. A third seal layer defines a third seal layer aperture extending through the third seal layer. The second seal layer is positioned between the first seal layer and the third seal layer such that the first seal layer aperture is in fluid communication with the first end and the third seal layer aperture is in fluid communication with the second end.

Another aspect of the present subject matter is directed to a gas turbine engine. The gas turbine engine includes a compressor, a combustion section, and a turbine section having a turbine shroud mount and a stator vane mount. A seal is disposed between the turbine shroud mount and the stator vane mount. The seal includes a first seal layer defining a first seal layer aperture extending through the first seal layer. A second seal layer defines an elongated slot extending through the second seal layer. The elongated slot comprises a first end and a second end. A third seal layer defines a third seal layer aperture extending through the third seal layer. The second seal layer is positioned between the first seal layer and the third seal layer such that the first seal layer aperture is in fluid communication with the first end and the third seal layer aperture is in fluid communication with the second end.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 3 is an enlarged perspective view of the sealing assembly in FIG. 2, illustrating a top seal layer, a middle seal layer, and a bottom seal layer;

FIG. 4 is a perspective view of the top seal layer, illustrating a top seal layer aperture therein;

FIG. 5 is a perspective view of the middle seal layer, illustrating an elongated slot therein;

FIG. 6 is a perspective view of the bottom seal layer, illustrating a bottom seal layer aperture therein;

FIG. 7 is a cross-sectional view of the seal assembly taken generally about line 7-7 in FIG. 3, illustrating the relative orientation of the top seal layer aperture, the elongated slot, and the bottom seal layer aperture.

DETAILED DESCRIPTION OF THE INVENTION

Figure 1:
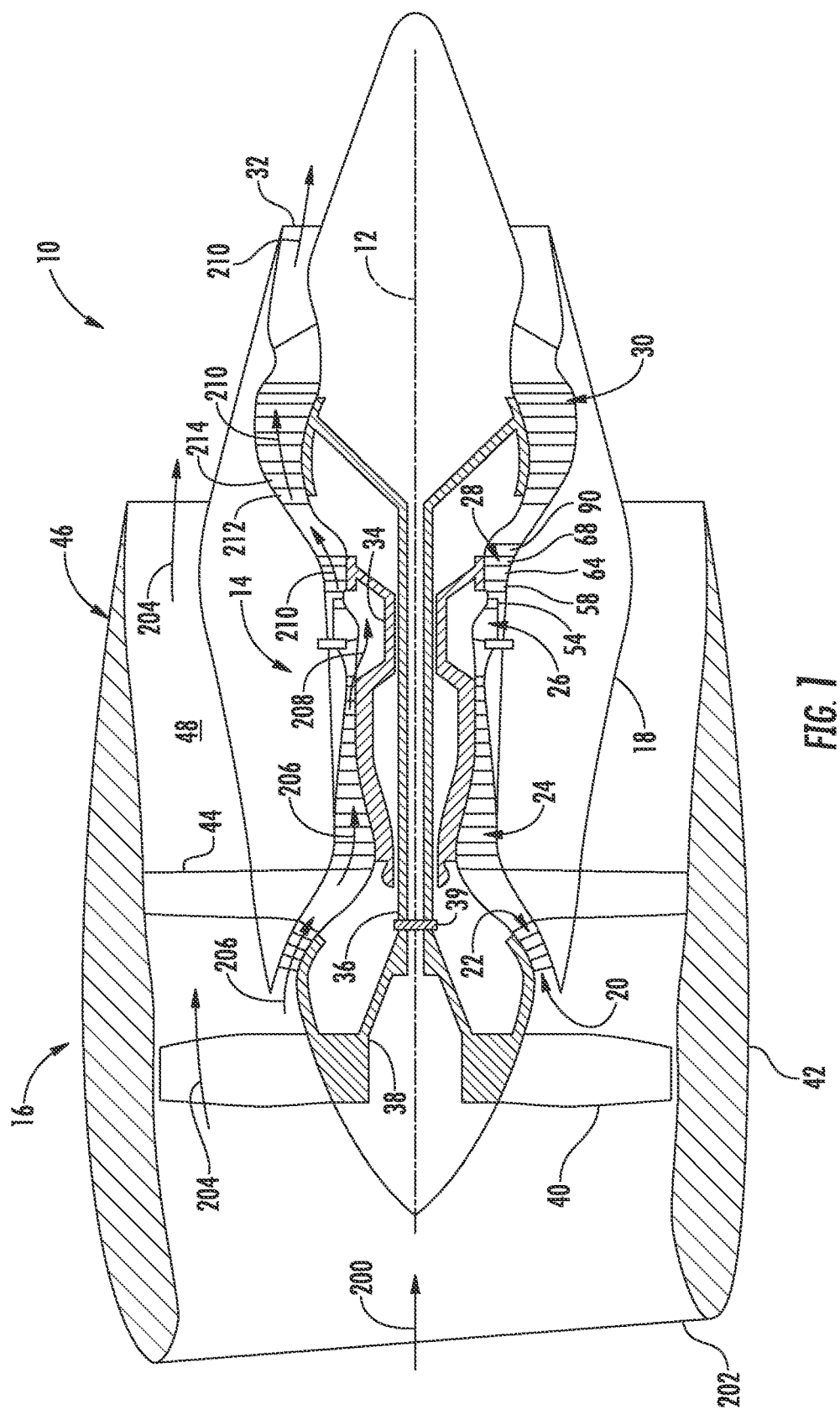
FIG. 1 is a schematic cross-sectional view of an exemplary high bypass turbofan jet engine in accordance with the embodiments disclosed herein.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Although exemplary embodiments of the present invention will be described generally in the context of a turbine shroud incorporated into a turbofan jet engine for purposes of illustration, one of ordinary skill in the art will readily appreciate that embodiments of the present invention may be applied to any turbine incorporated into any turbomachine and are not limited to a gas turbofan jet engine unless specifically recited in the claims.

Referring now to the drawings, wherein identical numerals indicate the same elements throughout the figures, FIG. 1 is a schematic cross-sectional view of an exemplary high bypass turbofan type gas turbine engine 10 herein referred to as "turbofan 10" as may incorporate various embodiments of the present invention. As shown in FIG. 1, the turbofan 10 has a longitudinal or axial centerline axis 12 extending therethrough for reference purposes. In general, the turbofan 10 may include a core turbine or gas turbine engine 14 disposed downstream from a fan section 16.

The gas turbine engine 14 may generally include a substantially tubular outer casing 18 that defines an annular inlet 20. The outer casing 18 may be formed from multiple casings. The outer casing 18 encases, in serial flow relationship, a compressor section having a booster or low pressure (LP) compressor 22 and a high pressure (HP) compressor 24, a combustion section 26, a turbine section having a high pressure (HP) turbine 28 and a low pressure (LP) turbine 30, and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The LP spool 36 may also connect to a fan spool or shaft 38 of the fan section 16. In particular embodiments, as shown in FIG. 1, the LP spool 36 may connect directly to the fan spool 38, such as in a direct-drive configuration. In alternative configurations, the LP spool 36 may connect to the fan spool 38 via a reduction gear 39, such as in an indirect-drive or geared-drive configuration.

As shown in FIG. 1, the fan section 16 includes a plurality of fan blades 40 coupled to and extending radially outwardly from the fan spool 38. An annular fan casing or nacelle 42 circumferentially surrounds the fan section 16 and/or at least a portion of the gas turbine engine 14. It should be appreciated by those of ordinary skill in the art that the nacelle 42 may be configured to be supported relative to the gas turbine engine 14 by a plurality of circumferentially-spaced outlet guide vanes 44. Moreover, a downstream section 46 of the nacelle 42 may extend over an outer portion of the gas turbine engine 14 to define a bypass airflow passage 48 therebetween.

Figure 2:
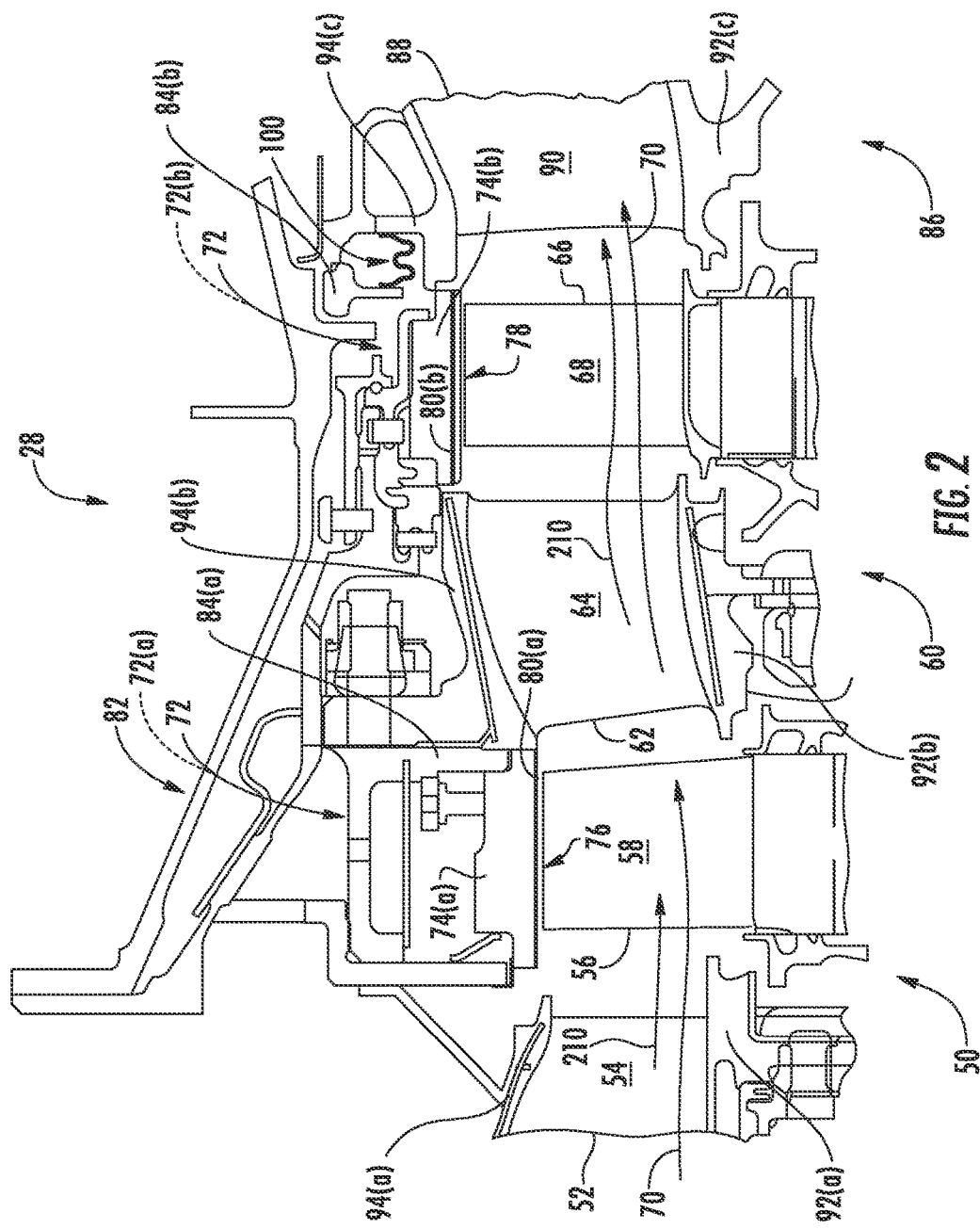
FIG. 2 is an enlarged cross sectional side view of a high pressure turbine portion of the gas turbine engine shown in FIG. 1, illustrating the location of a sealing assembly in a high pressure (HP) turbine.

FIG. 2 is an enlarged cross-sectional view of the HP turbine 28 portion of the gas turbine engine 14 as shown in FIG. 1, which may incorporate various embodiments disclosed herein. As shown in FIG. 2, the HP turbine 28 includes, in serial flow relationship, a first stage 50 having a row 52 of one or more stator vanes 54 (only one shown) axially spaced apart from a row 56 of one or more turbine rotor blades 58 (only one shown). The HP turbine 28 further includes a second stage 60 having a row 62 of one or more stator vanes 64 (only one shown) axially spaced apart from a row 66 of one or more turbine rotor blades 68 (only one shown). The HP turbine 28 may include a third stage 86 having a row 88 of one or more stator vanes 90 (only one shown). Although not shown in FIG. 2, the third stage 86 may also include a row of turbine rotor blades.

The turbine rotor blades 58, 68 extend radially outwardly from and are coupled to the HP spool 34 (FIG. 1). As shown in FIG. 2, the stator vanes 54, 64, 90 and the turbine rotor blades 58, 68 at least partially define a hot gas path 70 for routing combustion gases from the combustion section 26 (FIG. 1) through the HP turbine 28. As shown in FIG. 1, the rows 52, 62, 88 of the stator vanes 54, 64, 90 are annularly arranged about the HP spool 34 and the rows 56, 66 of the turbine rotor blades 58, 68 are circumferentially spaced around the HP spool 34. The stator vanes 54, 64, 90 respectively mount to the HP turbine 28 via a radially inner stator vane mount 92a, 92b, 92c and a radially outer stator vane mount 94a, 94b, 94c or any other suitable hardware components.

As shown in FIG. 2, various embodiments of the HP turbine 28 include at least one turbine shroud assembly 72. For example, the HP turbine 28 may include a first turbine shroud assembly 72(a) and a second turbine shroud assembly 72(b). Each turbine shroud assembly 72(a), 72(b) generally forms a ring or shroud around the corresponding row 56, 66 of turbine rotor blades 58, 68. Each turbine shroud assembly 72(a), 72(b) includes a turbine shroud or shroud seal 74(a), 74(b) radially spaced from blade tips 76, 78 of the turbine rotor blades 58, 68. This arrangement forms clearance gaps between the blade tips 76, 78 and sealing surfaces or hot side surfaces 80(a), 80(b). It is generally desirable to minimize the clearance gap between the blade tips 76, 78 and the turbine shrouds 74(a), 74(b), particularly during cruise operation of the turbofan 10, to reduce leakage from the hot gas path 70 over the blade tips 76, 78 and through the clearance gaps.

In particular embodiments, at least one of the turbine shrouds 74(a), 74(b) may be formed as a continuous, unitary or seamless ring. Each turbine shroud assembly 72(a), 72(b) may be connected to a static structure such as a backbone or casing 82 of the gas turbine engine 14 via a shroud ring assembly mount 84(a), 84(b) or other suitable hardware components.

As illustrated in FIG. 1, air 200 enters an inlet portion 202 of the turbofan 10 during operation thereof. A first portion of the air 200 indicated by arrow 204 flows into the bypass flow passage 48, and a second portion of the air 200 indicated by arrow 206 enters the inlet 20 of the LP compressor 22. The LP compressor 22 progressively compresses the second portion of air 206 flowing therethrough en route to the HP compressor 24. The HP compressor 24 further compresses the second portion of the air 206 flowing therethrough 24, thus providing compressed air indicated by arrow 208 to the combustion section 26 where it mixes with fuel and burns to provide combustion gases indicated by arrow 210.

The combustion gases 210 flow through the HP turbine 28 where the stator vanes 54, 64, 90 and turbine rotor blades 58, 68 extract a first portion of kinetic and/or thermal energy from the combustion gases 210. This energy extraction supports operation of the HP compressor 24. The combustion gases 210 then flow through the LP turbine 30 where sequential stages of LP turbine stator vanes 212 and LP turbine rotor blades 214 coupled to the LP shaft or spool 36 extract a second portion of thermal and kinetic energy from the combustion gases 210. This energy extraction causes the LP shaft or spool 36 to rotate, thereby supporting operation of the LP compressor 22 and/or rotation of the fan spool or shaft 38. The combustion gases 210 then flow through the jet exhaust nozzle section 32 of the gas turbine engine 14.

Along with a turbofan 10, a core turbine 14 serves a similar purpose and sees a similar environment in land-based gas turbines, turbojet engines in which the ratio of the first portion of air 204 to the second portion of air 206 is less than that of a turbofan, and unducted fan engines in which the fan section 16 is devoid of the nacelle 42. In each of the turbofan, turbojet, and unducted engines, a speed reduction device (e.g., the reduction gearbox 39) may be included between any shafts and spools. For example, the reduction gearbox 39 may be disposed between the LP spool 36 and the fan shaft 38 of the fan section 16.

The temperature of the combustion gases 210 flowing through the HP and LP turbine sections 28, 30, and particularly through the HP turbine 28, may be extreme. For example, the combustion gases 210 flowing through the hot gas path 70 defined by/within the HP turbine 28 may exceed 2000 degrees Fahrenheit. In this respect, the components disposed along the hot gas path 70 (e.g., stator vanes 54, 64, 90; turbine rotor vanes 58, 68; turbine shroud assemblies 72a, 72b; etc.) are typically constructed from a metal, a ceramic matrix composite (CMC), or any other material capable of withstanding prolonged exposure to the hot gasses.

Nevertheless, the components positioned radially outward from the hot gas path 70 (e.g., the casing 82) may have less favorable thermal properties. In this respect, a sealing assembly 100 may be disposed between adjacent stationary components along the hot gas path 70 to prevent hot exhaust gases from flowing therebetween. In the embodiment shown in FIG. 2, for example, the sealing assembly 100 is positioned between the shroud assembly mount 84(b) and the radially inner stator vane mount 94. Although, the sealing assembly 100 may be disposed between any adjacent stationary components in the low HP turbine 28, the LP turbine 30, or anywhere else in the gas turbine engine 10. The sealing assembly 100 preferably extends around the entire circumference of the HP turbine 28 or LP turbine 30.

FIGS. 3-7 illustrate the various components and features of the sealing assembly 100. More specifically, FIG. 3 is a perspective view of the sealing assembly 100, illustrating a top seal layer 102, a middle seal layer 104, and a bottom seal layer 106. FIGS. 4-6 are perspective views of the top seal 102, middle seal 104, and bottom seal 106, respectively. FIG. 7 is a cross-sectional view, illustrating a top seal member aperture 108, an elongated slot 110 in the middle seal layer 104, and a bottom seal layer aperture 112.

With respect to FIG. 3, the sealing assembly 100 may include the middle seal layer 104 positioned between the top seal layer 102 and the bottom seal layer 106. Although, the seal assembly 100 may have more than three seal layers as well. The seal layers 102, 104, 106 may have substantially the same thickness. Although, the seal layers 102, 104, 106 may have different thicknesses as well. In some embodiments, the seal layers 102, 104, 106 have a generally W-shape or M-shape. In the embodiment shown in FIG. 3 and discussed in greater detail below, the seals layers 102, 104, 106 include four generally vertical or angled walls connected by two axially outer convolutions or curved portions and one central convolution or curved portion. Upon axial compression, the convolutions exert outward force against the stationary components, thereby improving sealing. In another embodiment of the seals layers 102, 104, 106, the three convolutions may be replaced with flat portions. Alternately, the four angled walls of the seals layers 102, 104, 106 may be joined together without convolutions or flat portions. The seal layers 102, 104, 106 may also have a U-shape or any other suitable shape. In further alternate embodiments, the seal layers 102, 104, 106 may have more or less vertical or angled wall and more or less concave or convex convolutions as is necessary to fill the space between the stationary components. For example, the seal layers 102, 104, 106 may have three concave convolutions and two convex convolutions.

The sealing assembly 100 may be externally or internally pressurized. When externally pressurized, the pressure on the radially outer side of the sealing assembly 100 is greater than the pressure on the radially inner side thereof. In the case of the embodiment of the sealing assembly 100 having four angled walls connected by two axially outer convolutions and one central convolution, the axially outer convolutions are concave and the central convolution is convex, thereby forming a generally W-shape as illustrated in FIG. 3. Alternately, when the sealing assembly 100 is internally pressurized, the pressure on the radially outer side of the sealing assembly 100 is less than the pressure on the radially inner side thereof. In this respect, the axially outer convolutions are convex and the central convolution is concave, thereby forming a generally M-shape.

In one embodiment, the seal layers 102, 104, 106 are preferably removeably or slidably joined together to maintain flexibility. That is, the bottom seal layer 106 supports and positions the middle seal layer 104 and the middle seal layer 104 supports and positions the top seal layer 102. In this respect, the seal layers 102, 104, 106 may be attached with the use of adhesive or mechanical fasteners. In alternative embodiments, the seals layer 102, 104, 106 may be adhesively bonded, pinned together, riveted together, or otherwise permanently attached together for use in applications requiring greater stiffness.

FIG. 4 illustrates the one embodiment of the top seal layer 102. More specifically, the top seal layer 102 may include a first outer side wall 114a and a first inner side wall 116a integrally connected by a first convolution 118a. The top seal layer 102 may further include a second outer side wall 120a and a second inner side wall 122a integrally connected by a second convolution 124a. The first inner side wall 116a and the second inner side wall 122a may be integrally connected by third or center convolution 126a. Alternately, the side walls 114a, 116a, 120a, 122a and/or convolutions 118a, 124a, 126a may be separate components permanently adhered to one another. The convolutions 118a, 124a, 126a may be curved or flat.

As illustrated in FIG. 4, the center convolution 126a may define the top seal layer aperture 108. Although, any other portion of the top seal layer 102 may define the top seal layer aperture 108. For example, any of the flat portions of the first outer side wall 114a, the first inner side wall 116a, the second outer side wall 120a, or the second inner side wall 122a may define the top seal layer aperture 108. The aperture 108 extends through the entire thickness of the top seal layer 102. The aperture 108 may have any suitable cross-sectional shape (e.g., circular, elliptical, rectangular, oval, triangular, etc.). The aperture 108 may be created via water jet, piercing, or any other suitable manufacturing method. In some embodiments, the top seal layer 102 may include multiple top seal layer apertures 108.

FIG. 5 illustrates the one embodiment of the middle seal layer 104. More specifically, the middle seal layer 104 may include a first outer side wall 114b and a first inner side wall 116b integrally connected by a first convolution 118b. The middle seal layer 104 may further include a second outer side wall 120b and a second inner side wall 122b integrally connected by a second convolution 124b. The first inner side wall 116b and the second inner side wall 122b may be integrally connected by third or center convolution 126b. Alternately, the side walls 114b, 116b, 120b, 122b and/or convolutions 118b, 124b, 126b may be separate components permanently adhered to one another. The convolutions 118b, 124b, 126b may be curved or flat. The middle seal layer 104 should be larger than the top seal layer 102 to permit the top seal layer 102 to nest in the middle seal layer 104 as illustrated in FIG. 3.

As illustrated in FIG. 5, the center convolution 126b may define the elongated slot 110. Although, any other portion of the middle seal layer 104 may define the elongated slot 110. For example, any of the flat portions of the first outer side wall 114b, the first inner side wall 116b, the second outer side wall 120b, or the second inner side wall 122b may define the elongated slot 110. The elongated slot 110 extends through the entire thickness of the middle seal layer 104. The elongated slot 110 is relatively longer than length, width, and/or radius (as applicable) of the top seal layer aperture 108. For example, the elongated slot 110 may be at least five times longer than the length, width, and/or radius of the top seal layer aperture 108. In an alternate embodiment, the elongated slot 110 may be at least ten times longer than the length, width, and/or radius of the top seal layer aperture 108. Like the top seal layer aperture 108, the elongated slot 110 may be created via water jet, piercing, or any other suitable manufacturing method. The top seal layer 102 may include multiple middle seal layer elongated slots 110 in some embodiments.

FIG. 6 illustrates the one embodiment of the bottom seal layer 106. More specifically, the bottom seal layer 106 may include a first outer side wall 114c and a first inner side wall 116c integrally connected by a first convolution 118c. The bottom seal layer 106 may further include a second outer side wall 120c and a second inner side wall 122c integrally connected by a second convolution 124c. The first inner side wall 116c and the second inner side wall 122c may be integrally connected by third or center convolution 126c. Alternately, the side walls 114c, 116c, 120c, 122c and/or convolutions 118c, 124c, 126c may be separate components permanently adhered to one another. The convolutions 118c, 124c, 126c may be curved or flat. The bottom seal layer 106 should be larger than the middle seal layer 104 to permit the middle seal layer 104 to nest in the bottom seal layer 106 as illustrated in FIG. 3.

As illustrated in FIG. 6, the center convolution 126c may define the bottom seal layer aperture 112. Although, any other portion of the bottom seal layer 106 may define the bottom seal layer aperture 112 For example, any of the flat portions of the first outer side wall 114c, the first inner side wall 116c, the second outer side wall 120c, or the second inner side wall 122c may define the bottom seal layer aperture 112. The aperture 112 extends through the entire thickness of the bottom seal layer 106. The aperture 112 may have any suitable cross-sectional shape (e.g., circular, elliptical, rectangular, oval, triangular, etc.). In one embodiment, the bottom seal layer aperture 112 may have substantially the same cross-sectional shape and/or cross-sectional area as the top seal layer aperture 108. In alternate embodiments, the bottom seal layer aperture 112 may have a different cross-sectional shape and/or cross-sectional area as the top seal layer aperture 108. In this embodiment, the elongated slot 110 should be relatively longer (e.g., at least five times longer, at least ten times longer, etc.) than the length, width, and/or diameter of the bottom seal layer aperture 112. The aperture 112 may be created via water jet, piercing, or any other suitable manufacturing method. The bottom seal layer 106 may include multiple bottom seal layer apertures 112.

FIG. 7 is a cross-sectional view of the sealing assembly 100, illustrating the relative orientations of the top seal layer aperture 108, the elongated slot 110, and the bottom seal layer aperture 112 defined by the center convolutions 126a, 126b, 126c. More specifically, the elongated slot 110 includes a first end 128 and a second end 130. The top seal layer aperture 108 is in fluid communication with a first position in the elongated slot such as the first end 128 of the elongated slot 110, and the bottom seal layer aperture 112 is in fluid communication with a second position such as the second end 130 of the elongated slot 110. As such, the apertures 108, 112 and the elongated slot 110 form a somewhat N-shaped passageway. In this respect, cooling air indicated by arrows 132 may enter the seal assembly 100 through the top seal layer aperture 108, flow through the elongated slot 110, and exit through the bottom seal layer aperture 112. Alternately, the cooling air 132 may flow in the opposite direction. Placing the top seal layer aperture 108 and the bottom seal layer aperture 112 on opposite ends of the elongated seal forces the cooling air to flow through the entire length of the elongated slot 110. This arrangement cools a greater portion of the sealing assembly 100 than aligning the top seal layer aperture 108 and bottom seal layer aperture 112 coaxially.

Figure 8:
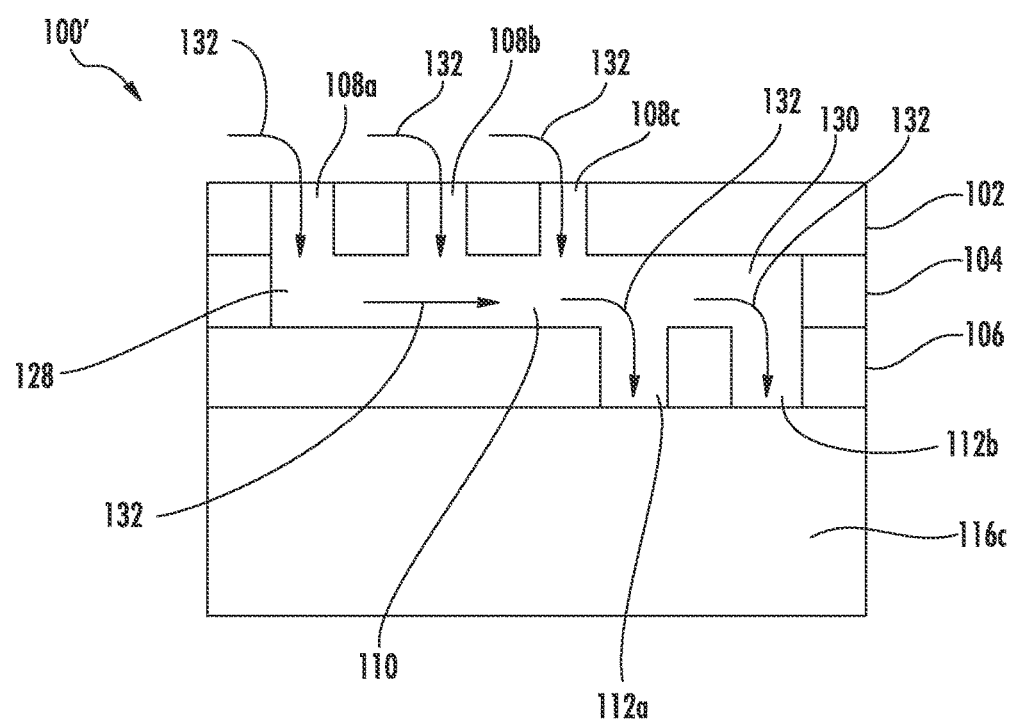
FIG. 8 is a cross-sectional view similar to FIG. 7 of an alternate embodiment of the seal, illustrating multiple top seal layer apertures and the bottom seal layer apertures in communication with the elongated slot.

FIG. 8 illustrates an alternate embodiment of the sealing assembly 100' that includes multiple top seal layer apertures 108 and/or multiple bottom seal layer apertures 112. The sealing assembly 100' generally includes at least the top seal layer 102, the middle seal layer 104, and the bottom seal layer 106 discussed in greater detail above. Although, the sealing assembly 100' may have more seal layers as well. As illustrated in FIG. 8, the top seal layer 102 includes a first top seal layer aperture 108a, a second top seal layer aperture 108b, and a third top seal layer aperture 108c in fluid communication with the first end 128 of the elongated slot 110. Although, the top seal layer 102 may have more or less top seal layer apertures 108, and the top seal layer apertures 108 may be in fluid communication with any part of elongated slot 110. Similarly, the bottom seal layer 106 includes a first bottom seal layer aperture 112a and a second bottom seal layer aperture 112b in fluid communication with the second end 130 of the elongated slot 110. Although, the bottom seal layer 106 may have more or less top seal layer apertures 112, and the bottom seal layer apertures 112 may be in fluid communication with any portion of elongated slot 110. Moreover, the top seal layer 102 may have more, less, or the same number of top seal layer apertures 108 as the bottom seal layer 106 has bottom seal layer apertures 112. Furthermore, the top seal layer apertures 108 and the bottom seal layer apertures 112 may be arranged along the elongated slot in any order. For example, the top seal layer apertures 108 and the bottom seal layer apertures 112 may be all grouped together as shown in FIG. 8. Alternately, the top seal layer apertures 108 and the bottom seal layer apertures 112 may alternate one after the other. Cooling air 132 flows through the sealing assembly 100' in a similar manner as in the sealing assembly 100.

The sealing assemblies 100, 100' may include more than one cooling passage. More specifically, the sealing assemblies 100, 100' two or more elongated slots 110 in communication with different sets of top and bottom seal layer apertures 108, 112 located in different portions of the seal layers 102, 104, 106. In one embodiment, for example, the first inner sidewall 116a and the second inner sidewall 122a may each include elongated slots 110 in communication with different sets of top seal layer apertures 108 and bottom seal layer apertures 112.

The seal layers 102, 104, 106 may be constructed from any suitable material. For example, the seal layers 102, 104, 106 may be formed from a nickel-based high temperature alloy (e.g., Rene 41® Alloy produced by General Electric Co. of Schenectady, N.Y., USA) or an austenitic nickel-based alloy (e.g., WASPALOY® produced by United Technologies Corporation of Hartford, Conn., USA). Alternately, the seal layers 102, 104, 106 may be a nickel-chromium-iron-molybdenum alloy (e.g., HASTELLOY® X produced by Haynes International of Kokomo, Ind., USA) or an austenite nickel-chromium alloy (e.g., INCONEL® alloy 718 produced by Special Metal Corporation of New Hartford, N.Y., USA).

In one embodiment, the seal layers 102, 104, 106 may be constructed from the same material. Alternately, the seal layers 102, 104, 106 may be constructed from different materials to take advantage of the disparate properties thereof. For example, the difference in thermal expansion coefficients may be used to strengthen the seal. Moreover, the seal layer proximate to the hot gas path 70 may be constructed from a material having a greater temperature tolerance (i.e., the ability to maintain structural rigidity at a temperature) than the material used to construct the other seal layers. In this respect, the seal layer proximate to the hot gas path 70 acts as a heat shield.

As discussed in greater detail above, the top seal layer aperture 108, the elongated slot 110, and the bottom sealing layer aperture 112 permit cooling air to flow through the sealing assembly 100 and remove heat from the same. This allows the sealing assembly 100 to withstand greater temperatures. In this respect, the turbofan 10 may operate at higher temperatures than with conventional seals. Higher operating temperatures improve efficiency and reduce specific fuel consumption. As such, the sealing assembly 100 facilitates greater efficiency and lower fuel consumption than conventional sealing arrangements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine sealing assembly, comprising:
a first static gas turbine wall;
a second static gas turbine wall; and
a seal disposed between the first static gas turbine wall and the second static gas turbine wall, the seal comprising:
a top seal layer defining a top seal layer aperture extending through the top seal layer;
a middle seal layer defining an elongated slot extending through the middle seal layer; and
a bottom seal layer defining a bottom seal layer aperture extending through the bottom seal layer, wherein the middle seal layer is positioned between the top seal layer and the bottom seal layer such that the top seal layer aperture is in fluid communication with a first position in the elongated slot and the bottom seal layer aperture is in fluid communication with a second position in the elongated slot;
wherein the top seal layer, the middle seal layer, and the bottom seal layer each comprise a first wall connected to a second wall by a convolution, and wherein the convolution of the top seal layer defines the top seal layer aperture, the convolution of the middle seal layer defines the elongated slot, and the convolution of the bottom seal layer defines the bottom seal layer aperture.

2. The gas turbine sealing assembly of claim 1, wherein the first static gas turbine wall comprises a turbine shroud assembly mount and the second gas static gas turbine wall comprises a stator vane assembly mount.

3. The gas turbine sealing assembly of claim 1, wherein the first wall of the top seal layer, the middle seal layer, and the bottom seal layer is a first inner wall, and wherein the second wall of the top seal layer, the middle seal layer, and the bottom seal layer is a second inner wall, and wherein the convolution of the top seal layer, the middle seal layer, and the bottom seal layer is a middle convolution.

4. The gas turbine sealing assembly of claim 1, wherein the bottom seal layer supports and positions the middle seal layer and the middle seal layer supports and positions the top seal layer.

5. The gas turbine sealing assembly of claim 1, wherein the first seal layer aperture or the bottom seal layer aperture comprise a circular cross-section.

6. The gas turbine sealing assembly of claim 1, wherein the elongated slot is at least five times longer than first seal layer aperture and the bottom seal layer aperture.

7. The gas turbine sealing assembly of claim 1, wherein the elongated slot is at least ten times longer than first seal layer aperture and the bottom seal layer aperture.

8. The gas turbine sealing assembly of claim 1, wherein the first seal layer aperture and the bottom seal layer aperture comprise the same cross-sectional area.

9. The gas turbine sealing assembly of claim 1, wherein the first seal layer aperture and the bottom seal layer aperture comprise the same shape.

10. A gas turbine, comprising:
a compressor;
a combustion section;
a turbine section comprising:
a turbine shroud mount; and
a stator vane mount; and
a seal disposed between the turbine shroud mount and the stator vane mount, the seal comprising:
a top seal layer defining a top seal layer aperture extending through the top seal layer;
a middle seal layer defining an elongated slot extending through the middle seal layer; and a bottom seal layer defining a bottom seal layer aperture extending through the bottom seal layer, wherein the middle seal layer is positioned between the top seal layer and the bottom seal layer such that the top seal layer aperture is in fluid communication with a first position in the elongated slot and the bottom seal layer aperture is in fluid communication with a second position in the elongated slot, and the first position is a first end of the elongated slot and the second position is a second end of the elongated slot;

wherein the top seal layer, the middle seal layer, and the bottom seal layer each comprise a first wall connected to a second wall by a convolution, and wherein the convolution of the top seal layer defines the top seal layer aperture, the convolution of the middle seal layer defines the elongated slot, and the convolution of the bottom seal layer defines the bottom seal aperture.

11. The gas turbine of claim 10, wherein the first wall of the top seal layer, the middle seal layer, and the bottom seal layer is a first inner wall, and wherein the second wall of the top seal layer, the middle seal layer, and the bottom seal layer is a second inner wall, and wherein the convolution of the top seal layer, the middle seal layer, and the bottom seal layer is a middle convolution.

12. The gas turbine of claim 10, wherein the top seal layer, the middle seal layer, and the bottom seal layer each comprise three or more convolutions.

13. The gas turbine of claim 10, wherein the bottom seal layer supports and positions the middle seal layer and the middle seal layer supports and positions the top seal layer.

14. The gas turbine of claim 10, wherein the elongated slot is at least five times longer than the top seal layer aperture and the bottom seal layer aperture.

15. The gas turbine of claim 10, wherein the elongated slot is at least ten times longer than the top seal layer aperture and the bottom seal layer aperture.

* * * * *